United States Patent [19]

Matsushima et al.

[11] Patent Number: 6,000,035
[45] Date of Patent: *Dec. 7, 1999

[54] METHOD AND SYSTEM FOR IMPROVED POWER MANAGEMENT IN INFORMATION PROCESSING SYSTEM

[75] Inventors: Shinji Matsushima, Yokohama; Seiichi Kawano, Sagamihara; Masayoshi Nakano; Takashi Inui, both of Yokohama, all of Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/676,579

[22] Filed: Jul. 1, 1996

[30] Foreign Application Priority Data

Oct. 26, 1995 [JP] Japan ................................... 7-278904

[51] Int. Cl.$^6$ ........................................................ G06F 1/00
[52] U.S. Cl. ........................... 713/320; 713/323; 713/322
[58] Field of Search ........................ 395/750.01, 750.02, 395/750.03, 750.04, 750.05, 750.06, 750.07, 750.08; 713/300, 310, 320, 322, 323, 324, 330, 340

[56] References Cited

U.S. PATENT DOCUMENTS

| | | | |
|---|---|---|---|
| 4,365,290 | 12/1982 | Nelms et al. | 364/707 |
| 4,545,030 | 10/1985 | Kitchin | 395/560 |
| 4,980,836 | 12/1990 | Carter et al. | 395/750.04 |
| 5,083,266 | 1/1992 | Watanabe | 395/750.05 |
| 5,167,024 | 11/1992 | Smith et al. | 395/750 |
| 5,511,203 | 4/1996 | Wisor et al. | 395/750.04 |
| 5,515,539 | 5/1996 | Ohashi et al. | 395/750.06 |
| 5,596,756 | 1/1997 | O'Brien | 395/750.08 |
| 5,623,677 | 4/1997 | Townsley et al. | 395/750.02 |
| 5,628,019 | 5/1997 | O'Brien | 395/750.04 |
| 5,640,573 | 6/1997 | Gephardt et al. | 395/750.02 |
| 5,669,003 | 9/1997 | Carmean et al. | 395/750.04 |

OTHER PUBLICATIONS

"Method to provide low power standby mode for online devices" by R.C. Schwartz, IBM Technical Disclosure Bulletin, vol. 29, No. 11, Apr. 1987, p. 4763.

*Primary Examiner*—Ayaz R. Sheikh
*Assistant Examiner*—Xuong Chung-Trans
*Attorney, Agent, or Firm*—Daniel E. McConnell; George E. Grosser; Andrew J. Dillon

[57] ABSTRACT

An information processing system that can reduce the operating frequency of a CPU, or halt the operation of the CPU, at an adequate timing, even when the system is engaged in exchanging data with another independent apparatus (e.g., another PC) via a communication port (a serial port or a parallel port), or when a communication application is being executed. The system has (a) a CPU that operates in a normal mode, in a power saving mode in which less power is consumed than is required in a normal mode, or in a stop mode in which operation is completely halted; (b) at least one peripheral device; (c) a bus employed for communication between the CPU and the peripheral device; (d) a communication port, physically connected to another independent apparatus, for performing data transfer; (e) a bus cycle detector monitoring a bus cycle on the bus; (f) a state detector determining an operational mode of the CPU in response to a detection by the bus cycle of access of the communication port; (g) a signal generator providing, when the state detector ascertains that the operational mode is to be the power saving mode, a control signal to the CPU to set the CPU to the power saving mode; and (h) a CPU operation halting signal completely halting an operation of the CPU when the state determination means ascertains that the operational mode is to be the stop mode.

5 Claims, 7 Drawing Sheets

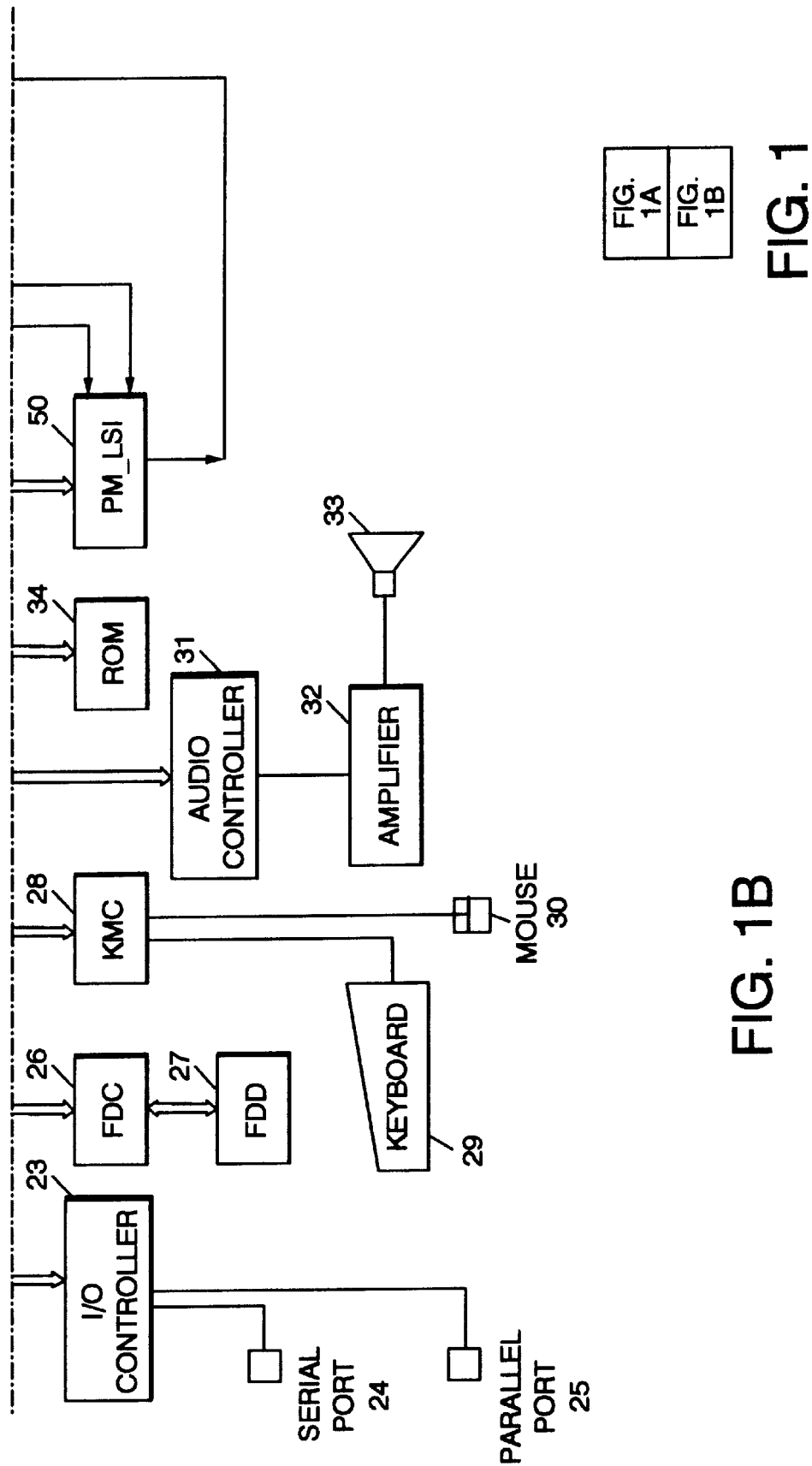

| I/O PORT ADDRESS | BYTE ENABLE VALUE |
|---|---|
| 3 F 8h | 1 1 1 0b |
| 3 F 9h | 1 1 0 1b |
| 3 F Ah | 1 0 1 1b |
| 3 F Bh | 0 1 1 1b |
| 3 F Ch | 1 1 1 0b |
| 3 F Dh | 1 1 0 1b |
| 3 F Eh | 1 0 1 1b |
| 3 B Ch | 1 1 1 0b |
| 3 B Dh | 1 1 0 1b |
| 3 B Eh | 1 0 1 1b |

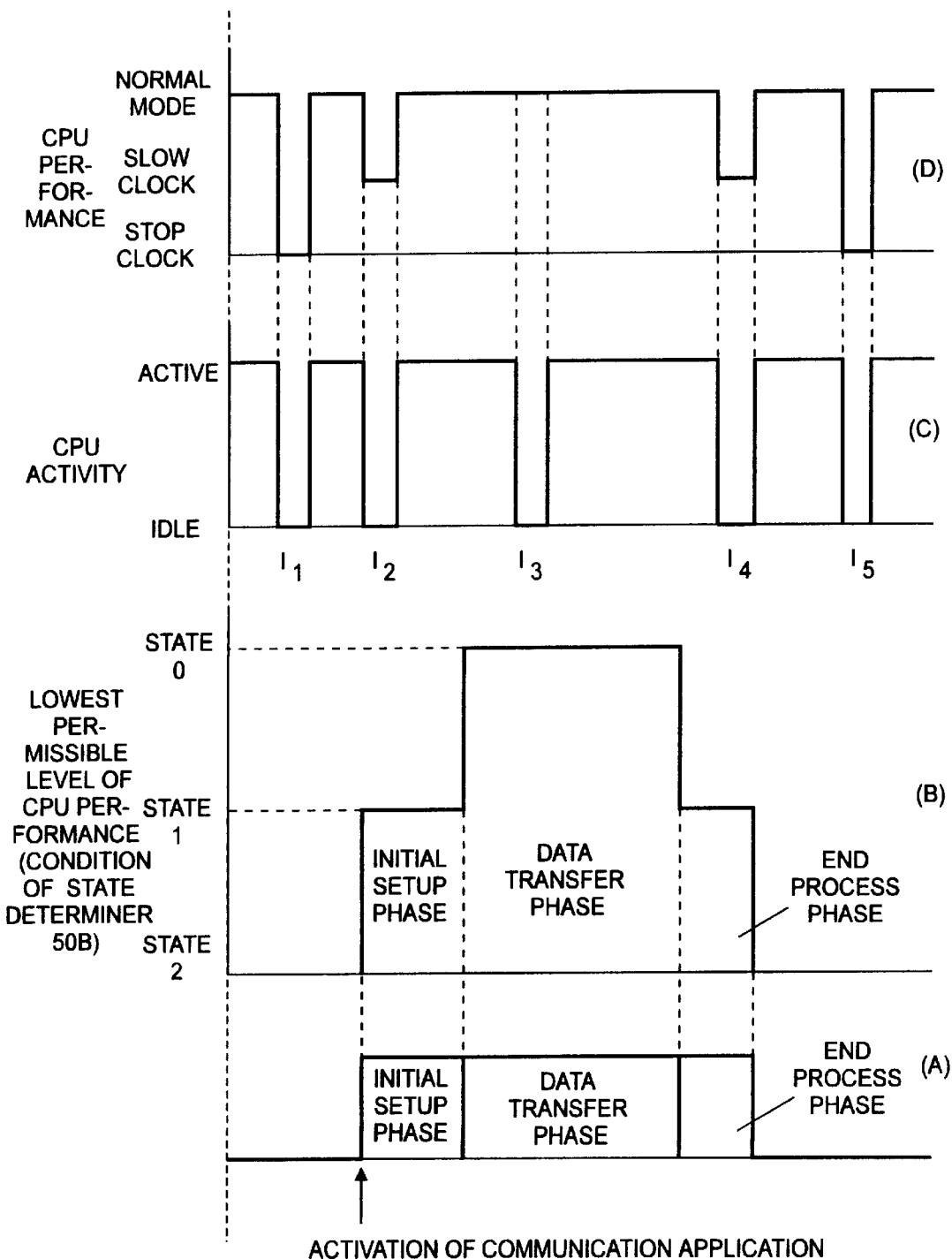

METHOD AND SYSTEM FOR IMPROVED POWER MANAGEMENT IN INFORMATION PROCESSING SYSTEM

BACKGROUND OF THE INVENTION

The present invention relates to an information processing system, such as a personal computer (PC), and in particular to an information processing system with a power saving function that reduces the operating frequency of a processor (a so-called CPU: Central Processing Unit) that assumes responsibility for data processing in the system, or halts the operation of the processor, for the purpose of reducing power consumption. More specifically, the present invention pertains to an information processing system that satisfies both requests for power saving and for security of the system, and that can reduce the operating frequency of the CPU or can halt the operation of the CPU, even during a period in which communication with another independent apparatus is taking place.

As progress in the current technique continues, various types of personal computers (hereafter referred to as "PCs" or "systems"), such as desktop and notebook computers, are being manufactured and widely sold. The notebook PCs that are being manufactured are compact and light, since for their design, portability and outdoor use are taken into consideration.

One of the features of notebook PCs is that they are "battery operable" and can be driven by an incorporated battery. Such a system can be used at sites where there are no commercially available power sources. A battery that is incorporated in a notebook PC is commonly formed as a "battery pack", which is a package that is comprised of a plurality of rechargeable battery cells, such as Ni-Cd, NiMH, or Li-Ion (also called a "secondary cell"). Although such a battery pack is reusable by recharged, the battery duration is sufficient to supply power for only two to three hours of system operation time. Therefore, various ideas for power saving have been implemented to extend the time between charge periods for a battery. The introduction of the power saving function can constitute another feature of the notebook PC.

At present, from an ecological point of view, the demand for power saving is increasing, even for desktop PCs to which power can be supplied almost endlessly by commercially available power sources. And in June 1993, the U.S. Environmental Protection Agency (EPA) advocated the self-imposed regulations that are collectively called the "Energy Star Computer Program", and required that power consumed in the standby state be lower than a predetermined value (driving power is to be 30 W or less, or 30% or less than it is when the CPU is active). Computer makers have developed and manufactured products that conform to the suggested regulation. For example, desktop PCs that have a power saving function are already sold by IBM Japan, Ltd. (e.g., the PS/55E (for which "Green PC" is a common name), PC 750, and the Aptiva series ("Aptiva" is a trademark of IBM Corp.)).

Power saving with a PC can be accomplished by, for example, reducing power consumption by the individual electric circuits during the operation. Power savings can also be provided by reducing or halting, as needed, the power supply to the individual electric circuits (or devices) in the system in accordance with the reduction of the operational state (activity). The latter power saving function may especially be called a "Power Management" function.

The power management modes of a PC are an "LCD backlight-OFF" mode and an "HDD-OFF" mode, which halts of the power supply to devices, such as an LCD (Liquid Crystal Display) and its backlight, or a rotary motor of an HDD (hard disk drive), that account for the greatest share of the total power consumption by a whole system. The other example power management modes are a "CPU slow clock/stop clock" mode, in which the operating frequency of a CPU (Central Processing Unit) is reduced or the operation of the CPU is halted, and a "Suspend" mode, in which the power supply to all the electric circuits, except for a main memory, is halted after data that are required for resuming the task are saved in the main memory.

As is well known, CPU chips are the units that constitute the nuclei for the computations that are performed by computer systems. Recently, as production techniques for manufacturing semiconductor devices have improved, as is demonstrated by the reduction in the wiring width, the operational frequencies of CPUs have increased even more. For example, there have appeared CPU chips, such as the "Pentium", which is sold by Intel Corp., and the "PowerPC" (a trademark of IBM Corp.), that can be driven at operational frequencies that exceed 100 MHz. The performance of a CPU and its operating frequency are very closely related. As the operational speed of a CPU rises, the speed at which it performs calculations increases accordingly. A fast CPU demonstrates its excellent capabilities especially when running large application programs and when performing graphics procedures.

But as nothing is perfect, the high processing speed of CPUs brings with it several problems. One of the problems concerns the increased power consumption by the CPUs and the consequent heat generation. As the strength of a current that passes across a transistor gate (i.e., a resistor) per unit time increases, the power consumption and the heat generation also increase. Theoretically, the power consumption by a CPU is proportional to the operating frequency. Currently, the ratio of the power consumption by a CPU to the total power consumption by the system can not be ignored.

The power management functions of the CPU, such as the "CPU slow clock/stop clock", are provided to overcome the above described condition. The "slow clock" and the "stop clock" are modes in which, when the system determines that a CPU is in the standby state or is in the idle state because a predetermined time has elapsed since a last key/mouse input, power consumption is reduced by lowering the operating frequency of the CPU (i.e., by reducing the performance of the CPU), or by halting its operation. It should be noted that the performance of the CPU is lowered only up to the point at which neither turn-around time (i.e., the time that is required from the reception of a request until the generation of an affirmative response) nor through-put (the quantity of jobs per unit time) is deteriorated. The "slow clock" and the "stop clock" functions of the CPU will be described below.

The slow clock function of the CPU can be achieved by changing the frequency of a clock signal input by an external oscillator. This function can also be achieved by changing a CPU chip's internal operating frequency while maintaining a constant input clock frequency to the CPU chip. A high speed processing CPU ordinarily receives a relatively low clock signal (for example, 66 MHz) and internally increases the speed of an operation clock (to, for example, double the speed, 133 MHz) by using an incorporated PLL (Phase Lock Loop) circuit. It is difficult for this type of CPU to drastically change an input clock frequency provided to the CPU chip because of the characteristic of a PLL circuit (e.g., the inherent vibration count of an oscillator or a delay time (several msec) required until the phase locking is performed). Therefore, another design method is employed for a CPU chip that incorporates not only a PLL circuit but also a slow clock function (power management function) that can internally change an operating clock. According to this method, the incorporated PLL circuit usually increases an input clock speed while the internal slow clock function autonomously lowers the performance of the CPU in the chip.

FIG. 8 is a schematic diagram illustrating the internal arrangement of a CPU that incorporates a power management function. In FIG. 8, a CPU chip 11 comprises a functional unit 11a that actually performs computation, etc.; a PLL circuit 11b that transmits, to the functional unit 11a, an operating clock signal for synchronous driving; and a performance controller 11c that controls the performance of the functional unit 11a. The CPU chip 11 communicates with its peripheral devices (not shown) via a processor bus 12.

The function of a PLL circuit whereby the frequency of an input clock signal is multiplied is well known. The PLL circuit 11b doubles the speed (66 MHz, for example) of a relatively slow clock signal to obtain an operating frequency (133 MHz, for example), and transmits the doubled clock signal to the functional unit 11a.

The functional unit 11a can be divided into a computation unit (a double shaded portion in FIG. 8) and an internal cache/control unit. The computation unit is a section whose performance can, to a degree, be reduced in accordance with the activity of the system (it should be noted that the performance of the computation unit can be lowered only to the degree that the turn around time and the through-put are not deteriorated). The internal cache/control unit is a section that must respond to an external event, such as a cache snoop, an interrupt request (INTR/NMI/SMI), or a hold request (HOLD) of the bus 12, that occurs unperiodically and in a time critical manner, and as a result, its performance can not be easily reduced.

The performance controller 11c controls the performance of the functional unit 11a in response to a control signal STPCLK# received from an external device. More specifically, while the STPCLK# is active (i.e., low), the controller 11c halts the supply of the operating frequency to the computation unit (the double shaded portion in FIG. 8) in the functional unit 11a. That is, the CPU chip 11 is so designed that its performance can be reduced locally. As a modification method, the STPCLK# that is to be inputted to the performance controller 11c is intermittently changed to active (i.e., goes low) to reduce the frequency of the operating clock transmitted from the PLL circuit 11b. For example, if the STPCLK# is set active (i.e., goes low) according to a predetermined cycle and the frequency of the operating clock is reduced by one of n times, the performance and power consumption of the computation unit is reduced to about (n−1)/n. The function that intermittently affects the STPCLK# input operation is generally called "clock throttling" or "frequency emulation".

In the slow clock mode, the input clock from the oscillator 40 and the operation of the PLL circuit 11b are not changed from those in the normal high speed operational mode. Therefore, recovery from the slow clock mode to the normal mode can be performed relatively rapidly. This matter should be well noted to understand the subject of the present invention, which will be described later.

SL enhanced 486s, DX2s and DX4s, and Pentiums, which are chips that have succeeded the "80486" CPU chip from Intel Corp., have the power saving function that is shown in FIG. 8. These chips include the STPCLK# as one of control signals on the processor bus 12.

The "stop clock" function completely prevents the input clocks from the oscillator 40, and halts the entire functional unit 11a. The complete stopping of the operating clock can be accomplished by virtue of a fully static arrangement of the CPU chip 11 in which a storing and saving function is not required. In the "stop clock" mode, the power consumption by the CPU is, at most, several hundreds of mW.

Since the PLL circuit 11b is also halted in the stop clock mode, a delay time of approximately 1 msec is required to stabilize the operation of the PLL circuit 11b (lock the phase) to recover to the normal high speed mode. This matter should be well noted to understand the subject of the present invention, which will be described later.

The power management operation, such as the slow clock/stop clock of the CPU, is commonly accomplished by cooperative functions involving hardware, which is provided outside of the CPU chip, that monitors the state of the system, and software executed by the CPU.

A specific software example for achieving the power management is the "APM" (Advanced Power management) that is jointly proposed by Intel Corp. and Microsoft Corp. The APM takes effect in the OS (Operating System) environment that is compatible with to the APM. The APM compatible OS environment is a system that is constituted by 1) hardware for which power saving is required, 2) a BIOS (also called an "APM BIOS") that actually performs the hardware operations required for power management, 3) an OS that can call the APM BIOS as the operational state (activity) of the system becomes lowered, and 4) an application that is compatible with the APM. For 1), the hardware is, for example, a CPU chip that has a slow clock/stop clock function. For 3), the APM compatible OS is, for example, PC DOS J6.1/V or any succeeding version, OS/2 J2.1 or any succeeding version ("OS/2" is a trademark of IBM Corp.), or Windows J3.1 or any succeeding version. The APM compatible OS generally includes an "APM" driver that calls an APM BIOS. For 4), the APM compatible application is an application program that registers itself in the APM driver via an API (Application Program Interface) to receive an inquiry for the start of the power management operation and to provide an affirmative response to the inquiry.

When software, such as the APM, that is resident in the OS is employed, the power management operation of the CPU involves the following procedures:

(1) When there is no effective task to be executed in a queue of a scheduler ("scheduler" is one of the modules in the OS), i.e., the system must wait for a next effective task to occur, it is ascertained that the CPU is in the idle state.

(2) In response to the detection of the idle state of the CPU, the APM driver calls the APM BIOS. The APM driver may exchange, with the APM application, the inquiry and the affirmative response for the start of power management.

(3) The APM BIOS, upon the call, performs hardware operation to shift the system to the power management state. For example, the APM BIOS performs intermittent throttling of the STPCLK# in order to shift the system to the slow clock state, or halts the input of a clock to the CPU chip 11 in order to shift the system to the stop clock state.

Since the OS can employ its own scheduler and can detect information in advance to the effect that "the system will enter the operation standby state", the power management operation can be efficiently carried out by a method using the APM.

The OS, however, can control only its own system. The OS can have no knowledge of the operational state, for example, of another independent apparatus (another PC) with which the system is physically connected and is communicating with via a communication port (a serial port or a parallel port). That is, the OS can manage a task for transmitting data from its own system, but can not detect an event wherein another independent apparatus has begun data transmission. Since data transfer is performed at a relatively high speed, the CPU must be fully active in order not to miss the data transfer. For example, if the CPU is in the slow clock state when another apparatus begins data transmission, some delay is caused in a data reception process performed by the CPU and data will be lost. And if the CPU is in the stop clock state when another apparatus begins data transmission, even though the CPU is to be recovered to the normal mode in response to the data reception, it takes some time before the operation of the CPU is stabilized, as is previously described, and the data transmitted to the CPU during that time will be lost. In short, if only the internal state of its own system is taken into consideration and the power management operation is begun by preference merely because the queue in the OS is empty, data exchanged will be lost, and as a result, the security of the system will be substantially degraded.

Regarding the security of the system as more important than the power saving effect, most of the PCs that are currently being sold on the market are so designed that the lowering of the performance of the CPU is thoroughly inhibited during a period when the system is exchanging data with another independent apparatus (for example, another PC). Or the PCs are so designed that the performance of the CPU is not lowered during the execution of the communication application (the communication application does not provide an affirmative response even upon the receipt of a power management request from the APM driver, and thus, the APM BIOS is not called). Therefore, though the CPU chip has a higher performance for power management (e.g., see FIG. 8), the system can utilize this function only when the CPU falls completely into the standby state (i.e., for a relatively long time). The period during which the CPU is fully in the standby state is very limited and is, at most, 1) when a predetermined time has elapsed since a last key input (e.g., Japanese Examined Patent Publication No. 06-95303, the fourth paragraph), or 2) when DMA transfer is performed because at this time the CPU relinquishes the control of its own local bus (e.g., Japanese Unexamined Patent Publication No. 06-266462). If the CPU enters the slow clock state or the stop clock state only during such a limited period, the obtained power management effect is not satisfactory. If possible, more opportunities during which the performance of the CPU can be lowered are desired. Even while data are exchanged with another independent apparatus via a communication port, for example, it is desired that the performance of the CPU be lowered to enhance the power management effect.

SUMMARY OF THE INVENTION

With the discussion above in mind, one purpose of the present invention, therefore, is to provide an excellent information processing system that has a power management function according to which power consumption is lowered by reducing the operating frequency of a processor (CPU) that serves as a nucleus for data processing, or by halting the operation of the processor.

It is another purpose of the present invention to provide an excellent information processing system that can reduce the operating frequency of a CPU, or halt the operation of the CPU, while the system satisfactorily responds to power management and system security requests.

It is an additional purpose of the present invention to provide an excellent information processing system that can, in accordance with an appropriate timing, reduce the operating frequency of a CPU, or halt the operation of the CPU, by exactly understanding the operational state of the CPU.

It is a further purpose of the present invention to provide an excellent information processing system that can, at an adequate timing, reduce the operating frequency of a CPU, or halt the operation of the CPU, even when the system is exchanging data with another independent apparatus (e.g., another PC) via a communication port (a serial port or a parallel port), or when a communication application is being executed.

BRIEF DESCRIPTION OF THE DRAWINGS

Some of the purposes of the invention having been stated, others will appear as the description proceeds, when taken in connection with the accompanying drawings, in which:

FIG. 7 is a graph showing the system 100 when it performs data transfer with another apparatus via a communication port, with FIG. 7(a) specifically showing individual phases while a communication application is being executed, FIG. 7(b) showing the determination results (conditions) of the state determiner 50b in the individual phases, FIG. 7(c) showing an example activity (the presence of an effective task in a queue) of the CPU, and FIG. 7(d) showing the performance (operational mode) of the CPU that is actually performed during the activities of the CPU.

DESCRIPTION OF THE PREFERRED EMBODIMENT(S)

Figure 1A:
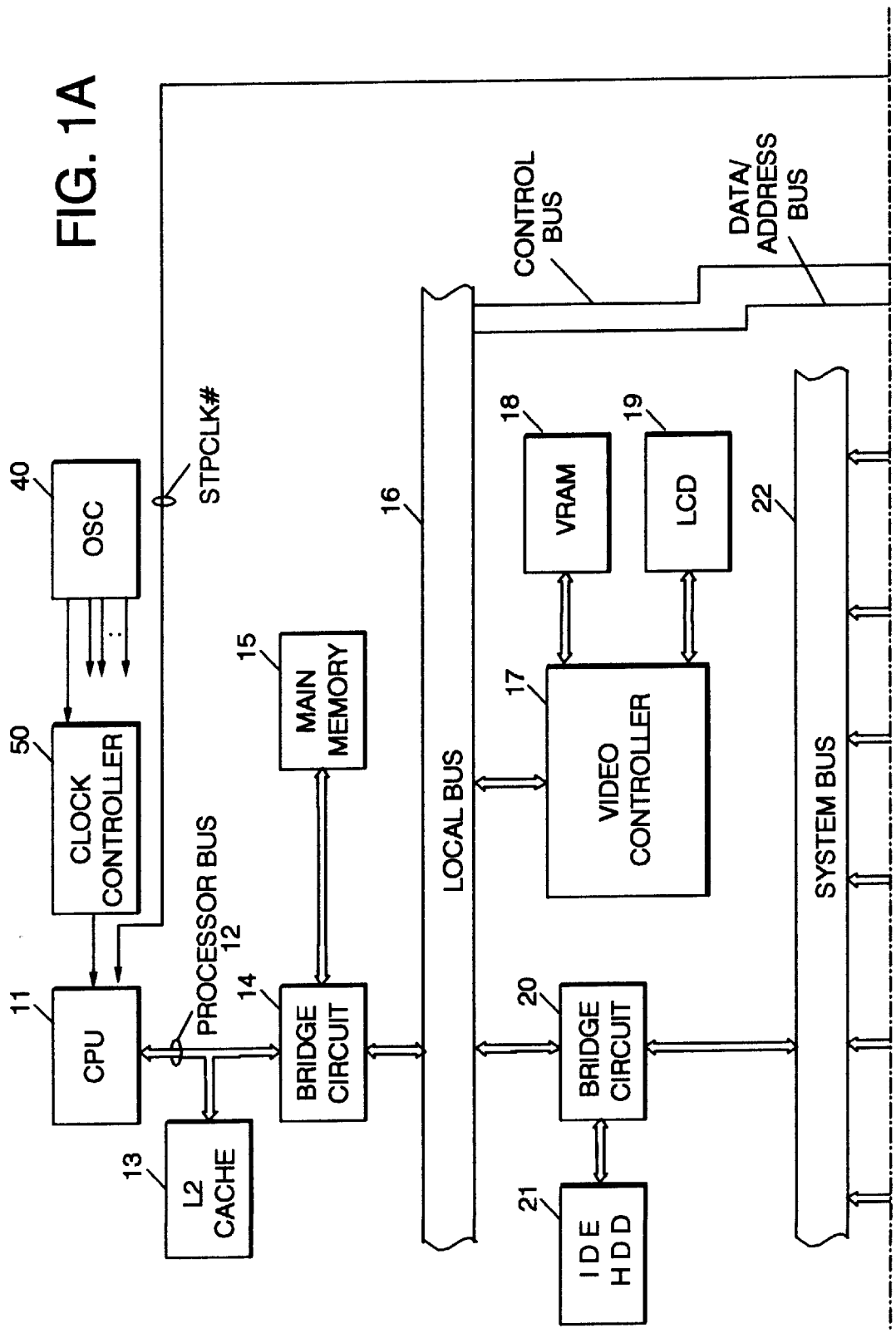
FIG. 1 is a diagram illustrating the hardware arrangement of a personal computer (PC) 100 that is employed for carrying out the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

To achieve the above purposes, according to a first aspect of the present invention, an information processing system has (a) a CPU that operates in a normal mode, in a power saving mode in which less power is consumed than is required in a normal mode, or in a stop mode in which operation is completely halted; (b) at least one peripheral device; (c) a bus employed for communication between the CPU and the peripheral device; (d) a communication port, physically connected to another independent apparatus, for performing data transfer; (e) a bus cycle detector monitoring a bus cycle on the bus; (f) a state detector determining an operational mode of the CPU in response to a detection by the bus cycle of access of the communication port; (g) a signal generator providing, when the state detector ascertains that the operational mode is to be the power saving mode, a control signal to the CPU to set the CPU to the power saving mode; and (h) CPU operation halting signal completely halting an operation of the CPU when the state detector ascertains that the operational mode is to be the stop mode.

In an information processing system in accordance with the first aspect of this invention, the bus cycle detector, the state detector, and the signal generator are embodied in a one-chip large scale integrated circuit (LSI) that is, for example, a power management LSI (PM_LSI) 50, which will be described later. A control signal generated by the signal generation means may be inputted to a control pin "STPCLK#" on the CPU chip. The CPU operation halting signal may be generated by a hardware component (e.g., a clock controller 60 which will be described later) that can halt the input of a clock to the CPU, for example. The power saving mode of the CPU may be a "slow clock" that is performed by intermittently driving the STPCLK#, and the stop mode may be a "stop clock" that is performed by completely halting the operating clock.

The communication port is, for example, a serial port or a parallel port.

The state detector or determination means may determine that the operational mode should be the power saving mode when a first predetermined time has elapsed, in the normal mode, since a last bus cycle for accessing a port address assigned to a data port for the serial transfer or for the parallel transfer. For example, one or more of address 3F8h (COM1), address 2F8h (COM2), address 3E8h (COM3), and address 2E8h (COM4) are assigned for the serial transfer data port. One or more of address 3BCh (LPT1), address 378h (LPT2), and address 278h (LPT3) are assigned to the parallel transfer data port.

The state detector may determine that the operational mode should be the stop mode when a second predetermined time has elapsed, in the power saving mode, since a last bus cycle for setting or canceling a control value for the serial transfer or the parallel transfer. Control/status registers for the serial transfer are assigned to I/O port address 3F9h to address 3FFh (COM1), address 2F9h to address 2FFh (COM2), address 3E9h to address 3EFh (COM3), or address 2F9h to address 2EFh (COM4). Control/status registers for the parallel transfer are assigned to I/O port address 3BDh to address 3BFh (LPT1), address 379h to address 37Fh (LPT2), or address 279h to address 27Fh (LPT3). The bus cycle detection means need only detect the access cycles for these addresses.

The state detector may determine that the operational mode should be the normal mode upon the occurrence of a bus cycle for accessing a port address assigned to a data port for the serial transfer or for the parallel transfer during the power saving mode. The port address is, for example, one of address 3F8h (COM1), address 2F8h (COM2), address 3E8h (COM3), and address 2E8h (COM4), or one of address 3BCh (LPT1), address 378h (LPT2), and address 278h (LPT3).

The state detector may determine that the operational mode is to be the power saving mode upon the occurrence of a bus cycle for setting or canceling a control value for the serial transfer or the parallel transfer during the stop clock mode. Control/status registers for the serial transfer are assigned to I/O port address 3F9h to address 3FFh (COM1), address 2F9h to address 2FFh (COM2), address 3E9h to address 3EFh (COM3), or address 2F9h to address 2EFh (COM4). Control/status registers for the parallel transfer are assigned to I/O port address 3BDh to address 3BFh (LPT1), address 379h to address 37Fh (LPT2), or address 279h to address 27Fh (LPT3). The bus cycle detection means need only detect the access cycles for these addresses.

According to a second aspect of the present invention, an information processing system has (a) a CPU that operates in a normal mode, a power saving mode in which less power is consumed than is required in a normal mode, or a stop mode in which operation is completely halted; (b) at least one peripheral device; (c) a bus employed for communication between the CPU and the peripheral device; (d) a communication port, physically connected to another independent apparatus, for performing data transfer; (e) a CPU monitor monitoring an operational state of the CPU; (f) a bus cycle detector monitoring a bus cycle on the bus; (g) a state detector responding to a detection of the bus cycle to access the communication port, determining that the CPU can enter either the power saving mode or the stop mode; (h) a signal generator providing a control signal to the CPU to set the CPU to the power saving mode; (i) CPU operation halting signal setting the CPU to the stop mode; and (j) a power saving control activating either the signal generator or the CPU operation halting signal in accordance with both a monitoring result obtained by the CPU monitor and a determination result obtained by the state detector.

In an information processing system in accordance with the second aspect of the present invention, the bus cycle detection means, the state determination means, and signal generation means are provided by a one-chip LSI that is, for example, the power management LSI (PM_LSI) 50, which will be described later. A control signal generated by the signal generation means may be inputted to a control pin "STPCLK#" on the CPU chip. The CPU operation halting means may be a hardware component (e.g., the clock controller 60, which will be described later) that can halt the input of a clock to the CPU, for example. The power saving mode of the CPU may be a "slow clock" that is performed by intermittently driving the STPCLK#, and the stop mode may be a "stop clock" that is performed by completely halting the operating clock.

The operation of the CPU monitoring means can be performed also by a software method whereby the APM driver refers to a queue of a scheduler, for example.

The operation of the power saving control means can also be performed by a software method whereby, when the APM driver detects that there is no effective task in a queue of the scheduler, i.e., that the queue is empty, the determination result obtained by the state determination means is referred to and either the signal generation means or the CPU operation halting means is activated, as needed (more specifically, the APM BIOS is called).

The communication port is, for example, a serial port or a parallel port.

The state determination means may determine that the CPU can enter the power saving mode when a first predetermined time has elapsed since a last bus cycle for accessing a port address assigned to a data port for the serial transfer or for the parallel transfer. The port address is, for example, one of address 3F8h (COM1), address 2F8h (COM2), address 3E8h (COM3), and address 2E8h (COM4), or one of address 3BCh (LPT1), address 378h (LPT2), and address 278h (LPT3)).

The state determination means may determine that the CPU can enter the stop mode when a second predetermined time has elapsed since a last bus cycle for setting or canceling a control value for the serial transfer or the parallel transfer. Control/status registers for the serial transfer are assigned to I/O port address 3F9h to address 3FFh (COM1), address 2F9h to address 2FFh (COM2), address 3E9h to address 3EFh (COM3), or address 2F9h to 2EFh (COM4). Control/status registers for the parallel transfer are assigned to I/O port address 3BDh to address 3BFh (LPT1), address 379h to address 37Fh (LPT2), or address 279h to address 27Fh (LPT3). The bus cycle detection means therefore need only detect access cycles for these addresses.

The state determination means may determine that the power saving mode is inhibited and should be returned to the normal mode upon the occurrence of a bus cycle for accessing a port address assigned to a data port for the serial transfer or for the parallel transfer in the power saving mode. The port address is, for example, one of address 3F8h (COM1), address 2F8h (COM2), address 3E8h (COM3), and address 2E8h (COM4), or one of address 3BCh (LPT1), address 378h (LPT2), and address 278h (LPT3)).

The state determination means may determine that the stop mode is inhibited and should be returned to the power saving mode upon the occurrence of a bus cycle for setting or canceling a control value for the serial transfer or the parallel transfer in the stop mode. Control/status registers for the serial transfer are assigned to I/O port address 3F9h to address 3FFh (COM1), address 2F9h to address 2FFh (COM2), address 3E9h to address 3EFh (COM3), or address 2F9h to address 2EFh (COM4). Control/status registers for the parallel transfer are assigned to I/O port address 3BDh to address 3BFh (LPT1), address 379h to address 37Fh (LPT2), or address 279h to address 27Fh (LPT3). The bus cycle detection means need only detect the access cycles to these addresses.

During a period that the state determination means permits the CPU to enter the power saving mode, when the CPU monitoring means has detected the idle state of the CPU, the power saving control means may activate the signal generation means.

During a period that the state determination means permits the CPU to enter the stop mode, when the CPU monitoring means has detected the idle state of the CPU, the power saving control means may activate the CPU operation halting means.

During a period wherein the state determination means inhibits the CPU from entering the power saving mode, the power saving control means may not activate the signal generation means regardless of the detection by the CPU monitoring means that the CPU is idle.

During a period wherein the state determination means inhibits the CPU from entering the stop mode, the power saving control means may not activate the CPU operation halting means regardless of the detection by the CPU monitoring means that the CPU is idle.

The exchange of data transfer by the system with another apparatus via a communication port (e.g., a serial port or a parallel port) is generally constituted by three phases: 1) an "initial setup phase" in which a control value for data transfer (e.g., a baud rate, an IRQ level, and an FIFO) is set in advance or the status of the communication port is confirmed; 2) a "data transfer phase" in which data exchange is performed; and 3) an "end process phase" in which a control value (e.g., the IRQ level) is canceled after data transfer is completed or the status of the communication port is confirmed. In the data transfer phase, the CPU must be fully active in order to process without delay data input or output at relatively high speed. In the initial setup phase and the end process phase, which are before or after data transfer is performed, the activity of the CPU may is low (especially, in the initial setup phase, a wait time until data transfer begins is included), so that the performance of the CPU can be lowered to a degree.

According to the first aspect of the present invention, the CPU in the normal mode can enter the power saving mode in response to the event that a first predetermined time has elapsed since a last access to the data port for data transfer. According to the second aspect of the present invention, the CPU in the normal mode is permitted to enter power saving mode in response to a event that a first predetermined time has elapsed since a last access to the data port for data transfer. If the idle state of the CPU (i.e., the queue is empty) is detected during the predetermined period, the power saving control means activates the signal generation means and the CPU immediately enters the power saving mode. When a first predetermined time has elapsed since a last access to the data port for the data transfer, this means that data exchange is not currently being performed with another independent apparatus, and thus the CPU does not have to be fully active. According to the first and second aspects of the present invention, the performance of the CPU can be reduced, as needed, so as to enhance the power management effect. In an IBM PC/AT compatible apparatus ("PC/AT" is a trademark of IBM Corp.), since I/O port address 3F8h (or one of address 2F8h, address 3E8h, and address 2E8h) is assigned to a data port for the serial transfer, and one of I/O port address 3BCh, address 378h, and address 278h is assigned for a data port for the parallel transfer, the bus cycle detection means need only detect access cycles for the pertinent addresses.

Further, according to the first aspect of the present invention, the CPU in the power saving mode is to enter the stop mode when a second predetermined time has elapsed since a last bus cycle for setting or canceling a control value for data transfer. According to the second aspect of the present invention, the CPU in the power saving mode is permitted to enter the stop mode when a second predetermined time has elapsed since a last bus cycle for setting or canceling a control value for data transfer. If the idle state of the CPU (i.e., the queue is empty) is detected during the predetermined period, the power saving control means activates the CPU operation halting means and the CPU immediately enters the stop mode. When a second predetermined time has elapsed since a last bus cycle for setting or canceling a control value for data transfer, this means that even a preprocess is not yet being performed for the transfer of data to another independent apparatus, or that a post process for data transfer has been completed. Thus, in this period, there is no probability that data transfer will be suddenly begun and thus the CPU must be activated rapidly. According to the first and the second aspects of the present invention, the operating clock of the CPU is halted, as needed, and the power management effect can be increased. In an IBM PC/AT compatible apparatus, I/O port address 3F9h and address 3FFh, address 2F9h and 2FFh, address 3E9h and address 3EFh, or address 2F9h and address 2EFh are assigned as field for storing a control value and a status for serial transfer. One of I/O port address 3BDh to address 3BFh address 379h to address 37Fh, and address 279h to address 27Fh address is assigned as an field for storing a control value or the status for parallel transfer. The bus cycle detection means therefore need only detect access cycles to the pertinent addresses.

According to the first aspect of the present invention, the CPU in the power saving mode is recovered to the normal mode in response to the occurrence of the access to the data port for data transfer. According to the second aspect of the present invention, the CPU is inhibited from being in the power saving mode upon the occurrence of the access to the data port for data transfer. Accordingly, the power saving control means deactivates the signal generation means, and the CPU immediately is recovered to the normal mode. When the access to the data port for data transfer has occurred, this means that data transfer to another independent apparatus should be begun and the CPU must be fully active. According to the first and the second aspects of the present invention, at the same time data transfer is begun, the CPU is recovered to the normal mode and begins full operation. In an IBM PC/AT compatible apparatus, I/O port address 3F8h (or one of address 2F8h, address 3E8h, and address 2E8h) is assigned as a data port for serial transfer. I/O port address 3BCh (or either address 378h or address 278h) is assigned as a data port for parallel transfer. The bus cycle detection means need therefore only detect access cycles for the pertinent addresses.

According to the first aspect of the present invention, the CPU in the stop mode is to be recovered to the power saving mode upon the occurrence of the bus cycle for setting or canceling a control value for data transfer. According to the second aspect of the present invention, the CPU is inhibited from being in the stop mode upon the occurrence of the bus cycle for setting or canceling a control value for data transfer. Accordingly, the power saving control means deactivates the CPU operation halting means, and the CPU is immediately recovered to the power saving mode. When a bus cycle for setting or canceling a control value for data transfer has occurred, this means that the phase enters the initial setup phase, and data transfer will be started. Although the CPU must be fully active in the normal mode at the time of data transfer, a delay time is required before the system can be recovered from the stop mode to the normal mode, and data received until the operation is stabilized would be lost. According to the first and the second aspects of the present invention, when the start of data transfer is expected while the CPU is in the stop mode, the CPU is recovered to the power saving mode in advance so that it can rapidly recover to the normal mode. In an IBM PC/AT compatible apparatus, I/O port address 3F9h and address 3FFh, address 2F9h and address 2FFh, address 3E9h and address 3EFh, or address 2F9h and address 2EFh, are assigned as areas for storing a control value and a status for serial transfer. I/O port address 3BDh and address 3BFh, address 379h and address 37Fh, or address 279h and address 27Fh are assigned as areas for storing a control value and the status for parallel transfer. The bus cycle detection means need therefore only detect access cycles for the pertinent addresses.

The present invention is provided in view of the fact that (1) the phase always enters the initial setup phase before it goes to the substantial data transfer phase in which full operation is required; and (2) the performance of the CPU can be reduced in the initial setup phase and the end process phase. In other words, when the phase is in the initial setup phase or in the end process phase, a reduction of the performance of the CPU is allowed to a degree. Further, in a period wherein the phase is expected to go to the substantial data transfer phase, such as a period that the access to the control register for data transfer is performed, a CPU in the stop mode is returned to the power saving mode and placed in the condition that it is ready for rapid recovery to the normal mode. In other words, the present invention seeks to reduce the power consumption by the bus cycle.

It is therefore possible to provide an excellent information processing system that can lower the performance of the CPU at an adequate timing so as to increase the power management effect, even when data transfer to another independent apparatus (e.g., another PC) is being performed (or a communication application is being executed).

One embodiment of the present invention will now be described in detail while referring to the accompanying drawings.

FIG. 1 is a diagram showing the hardware arrangement of a personal computer (PC) 100 employed for carrying out the present invention. The individual sections will now be explained.

Figure 8:
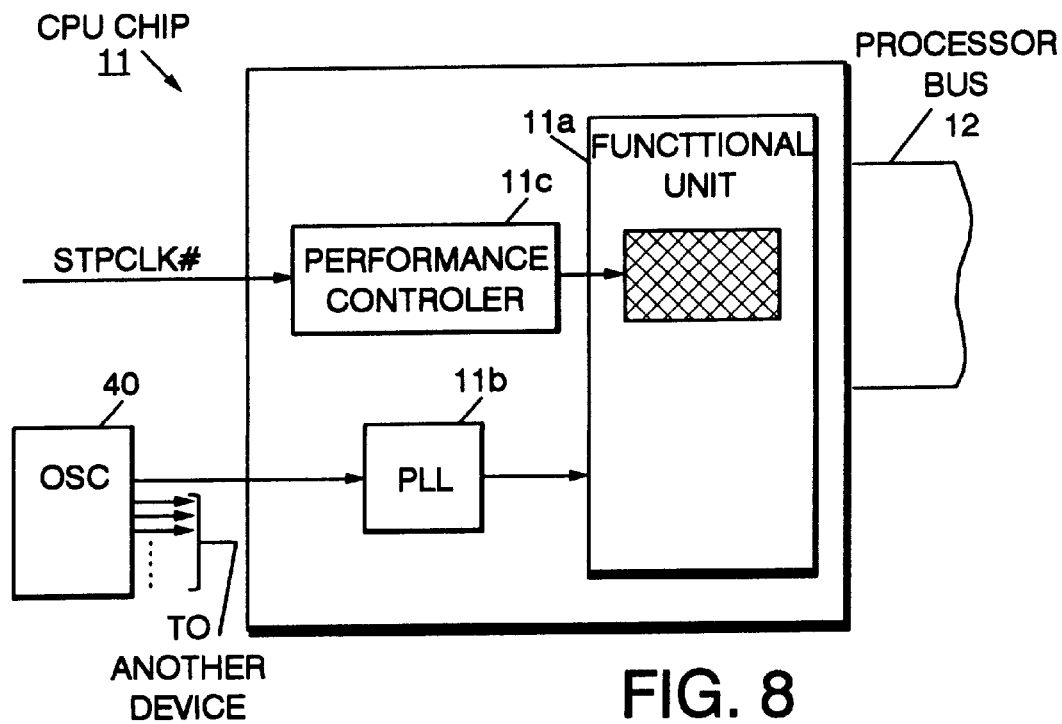
FIG. 8 is a schematic diagram illustrating the internal arrangement of the CPU chip 11 that incorporates a power management function.

A CPU 11, a main controller, executes various programs under the control of an operating system (OS). A processor bus 12 that runs from the CPU 11 communicates with the individual peripheral devices, which will be described later, across two bus layers, which are a local bus 16 and a system bus 22. The CPU 11 has substantially the same structure as that shown in FIG. 8, and a "Pentium/1xx MHz", which is sold by Intel Corp. may be employed, for example. The buses 12, 16, and 22 are common signal path lines that each include a data bus, an address bus, and a control bus. The local bus 16 is a relatively high speed bus that connects peripheral devices such as graphic devices. The PCI (Peripheral Component Interconnect) bus, supported by Intel Corp., is one example of such a local bus 16. The system bus 22 is a bus that connects relatively slow peripheral devices, such as an FDD, with an ISA (Industry Standard Architecture) bus being one example.

The processor bus 12 and the local bus 16 communicate with each other across a bridge circuit (host-PCI bridge) 14. The bridge circuit 14 in this embodiment includes a memory controller for controlling the access of a main memory 15, and a data buffer for absorbing the speed difference between the buses 12 and 16. The main memory 15 is a volatile memory (RAM) in which programs (the OS and application programs) executed by the CPU 11 are loaded, or which the CPU 11 employs as a work area. Dynamic RAM (DRAM), which is readily available and with which a large memory capacity can be acquired relatively inexpensively, is employed for the main memory 15, and a capacity of, for example, about 8 MB is considered as standard in the system 100. An external cache (also called a "Level 2 (L2)-cache") 13 is provided to absorb the difference between the processing speed of the CPU 11 and the access speed of the main memory 15. The L2-cache 13 is constituted by static RAM (SRAM), which is faster than DRAM, and has a memory capacity of approximately 256 KB, for example.

Peripheral devices, such as a video controller 17, for which a relatively high speed is required, are connected to the local bus 16. The video controller 17 is a peripheral controller for actually processing a drawing command sent from the CPU 11. The processed drawing information is temporarily written to a screen buffer (VRAM) 18, and the information is read from the VRAM 18 and is output to a liquid crystal display (LCD) 19 which serves as display means.

The local bus 16 and the system bus 22 communicate with each other across a bridge circuit (PCI-ISA bridge) 20. The bridge circuit 20 in this embodiment includes a DMA (Direct Memory Access) controller, an interrupt controller, and a programmable interval timer (PIT). The DMA controller is a peripheral controller that transfers data between the main memory 15 and peripheral devices, such as an FDD 27 that will be described later, without the involvement of the CPU 11. The interrupt controller handles hardware interrupt requests (IRQ) from the individual peripheral devices and transmits them to the CPU 11. The PIT supplies several types of timer signals to the individual sections of the system 100. A timer signal generated by the PIT is, for example, a periodical interrupt (INTR) that is provided to an OS/BIOS (which will be described later) at an interval of 55 msecs, a DRAM refresh timer signal of which the low/high level is switched at an interval of 15.2 μsecs, or a tone generation signal for the production of audio sounds.

The bridge circuit 20 further includes an interface for connecting a hard disk drive (HDD) 21 as an auxiliary storage device. (One example of the interface architecture is an IDE (Integrated Drive Electronics) interface. Originally, the IDE was the defacto standard for directly connecting a hard disk drive (HDD) to an ISA bus.)

The two bridge circuits 14 and 20 conform to the PCI, and are generally provided by a single chip set. A chip set example is the "Triton" chip set, which is sold by Intel Corp.

To the system bus 22 are connected relatively low speed peripheral devices, such as an I/O controller 23, a floppy disk controller (FDC) 26, a keyboard/mouse controller (KMC) 28, an audio controller 31, a ROM 34, and a power management LSI 50.

The I/O controller 23 is a peripheral controller for controlling the exchange of data via a communication port, such as a serial port 24 or a parallel port 25. The communication ports 24 and 25 have a connector with which they can be physically connected to another independent apparatus (another PC). The I/O controller 23 physically includes a data register and a control/status register for a serial transfer and for a parallel transfer. The individual I/O port addresses are assigned to the respective registers. An example specification of a serial port is RS-232C and an example specification of a parallel port is Centronics.

The FDC 26 is a dedicated controller for driving and controlling a floppy disk drive (FDD) 27.

The KMC 28 is a controller for processing a matrix input at a keyboard 29 and a coordinate set pointed at by a mouse 30. The KMC 28 converts an input signal into a format that conforms to the definition by the OS and outputs the result to the bus 22.

The audio controller 31 is a peripheral controller for handling input and output of audio signals. One of the functions of the audio controller 31 is the generation of a tone signal based on a specific frequency signal generated by the PIT. The output signal from the audio controller 31 is, for example, amplified by an amplifier 32, and the amplified signal is outputted through a loudspeaker 33.

The ROM 34 is nonvolatile memory for which written data are determined at the time of manufacture, and is employed for the permanent storage of predetermined codes. The codes stored in the ROM 34 include a test program (POST) that is conducted when the system 100 is powered on, and a program (BIOS) for controlling data input and output by the individual hardware components in the system 100.

An oscillator (OSC) 40 supplies an operating clock to a synchronously driven chip, such as the CPU 11. A clock signal is transmitted to the CPU 11 via a clock controller 60, which will be described later.

A power management LSI (PM-LSI) 50 is a special LSI that is used to accomplish an appropriate power management operation for the CPU 11. More specifically, the operation of the local bus 16 is monitored (also called a "bus snoop"), and the control signal STPCLK# (previously described) is outputted to the CPU 11 at a predetermined timing. The PM-LSI 50 is manufactured with a semi-custom design like a gate array. The LSI chip 50 plays the main role in implementing the present invention, and its detailed structure and operational characteristics will be described hereinafter.

The clock controller 60 can halt, as needed, a clock supplied by the OSC 40 to the CPU 11. As is mentioned in "Description of the Background", upon the receipt of the input of a control signal STPCLK#, the CPU 11 can lower or completely halt the operation in the partial functional unit of the CPU chip 11. The clock controller 60 halts the input clock to a PLL 11a to completely halt the CPU 11. The clock controller 60 in this embodiment is activated by the APM BIOS.

Almost all the PCs that are currently on sale in the market have hardware components that are equivalent to the block components that are denoted by reference numbers 11 through 40. Although many electric circuits other than those shown in FIG. 1 are required to constitute a PC, as they are well known to a person having ordinary skill in the art, and do not relate to the subject of the present invention, no explanation for these components is given in this specification.

Figure 2:
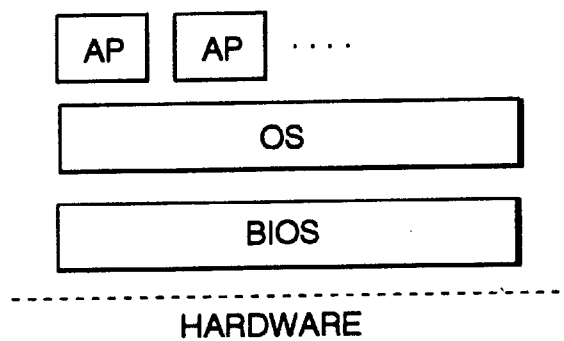
FIG. 2 is a schematic diagram illustrating the software arrangement that can be executed by the PC 100, which is employed for the present invention.

FIG. 2 is a schematic diagram illustrating the software arrangement that can be executed by the PC 100, and that is employed for carrying out the present invention.

The software at the lowest layer is a BIOS (Basic Input/Output System). The BIOS is a program assembly that consists of the basic operation commands for controlling the individual hardware components (the video controller 17, the keyboard 29, the HDD 21, and the FDC 26) in the system 100. Upon receipt of a call from programs of higher layer (an operating system or application programs, which will be described later), the BIOS provides the actual hardware operation. The BIOS includes a boot strap routine executed when the system 100 is powered on, and routines for handling interrupts generated on the bus 16 or 22.

The APM BIOS (previously described), with which the CPU chip 11 is actually operated by using hardware in the power management function of the present invention, is also present in this level.

The OS is the basic software for the total management of the hardware and the software of the system 100, and OS/2 ("OS/2" is a trademark of IBM Corp.) or Windows ("Windows" is a trademark of Microsoft Corp.) corresponds to the operating system.

The OS also includes a "file manager" that manages the files stored in a storage device, such as the HDD 21, a "scheduler" that determines the order of execution of tasks by the CPU 11 and the priority order, and a "memory manager" that is responsible for the allocation of memory. Further, a "user interface" (a system command and a system call) for the windows display and for the manipulation of a mouse is also included.

In addition, it should be understood that a "device driver" added later as hardware operating software is also one part of the OS. An example device driver is a display driver for driving a display device, such as the LCD 19. The above described APM driver that calls the APM BIOS is also present at this level.

The uppermost layer is occupied by APs. Programs for word processing, databases, calculations for charts, communication, etc., correspond to the APs. The APs are loaded, as needed, from the HDD 21 and the FDD 27 to the main memory 15 according to the intent of a user.

When the power management operation is to be executed, the APM (previously mentioned) compatible APs can perform a routine for a request/affirmative response with the APM driver by registering themselves in the APM driver.

The software hierarchial structure shown in FIG. 2 is well known to a person having ordinary skill in the art.

Figure 3:
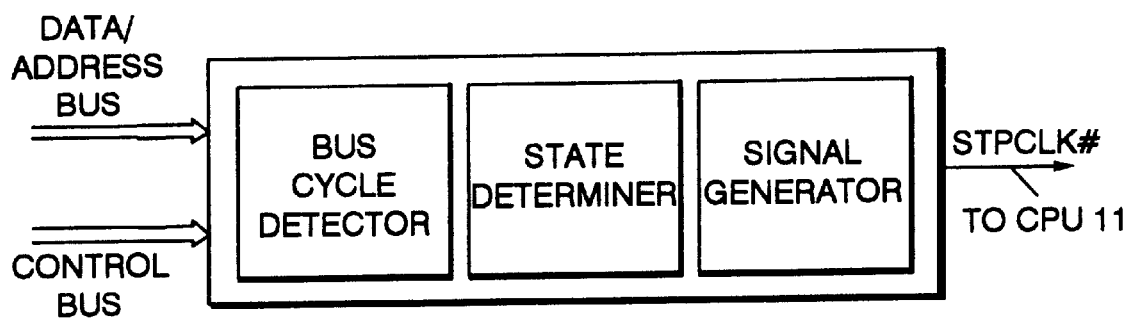
FIG. 3 is a diagram showing the internal arrangement of a power management LSI according to one embodiment of the present invention.

FIG. 3 is a diagram showing the internal arrangement of the power management LSI (PM-LSI) 50. The LSI chip 50 is mounted in the system 100 to appropriately accomplish the power management operation of the CPU according to the embodiment.

As is shown in FIG. 3, the PM-LSI 50 includes a bus cycle detector 50a, a state determiner 50b, and a signal generator 50c. The PM-LSI 50 monitors an address bus, a data bus, and a control bus that constitute the local bus 16, and outputs the control signal STPCLK# (one of the control signals on the processor bus 12) to the CPU 11.

The bus cycle detector (also called a "bus snoop") 50a monitors the bus cycle on the local bus 16. When the detector 50a detects the access to a specific I/O port address (i.e., a specific transaction has occurred), it notifies the state determiner 50b.

Figure 4:
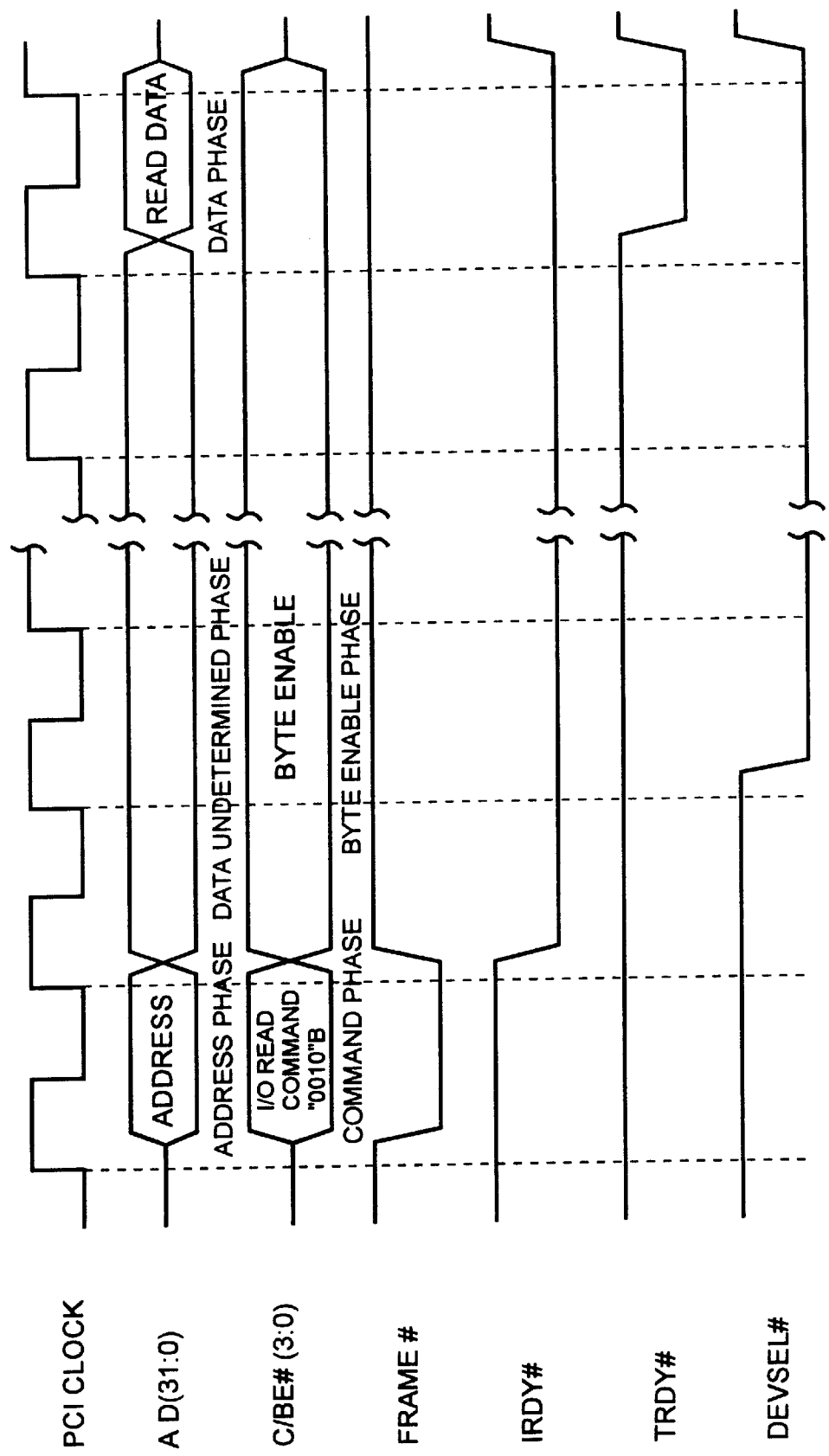
FIG. 4 is a timing chart for a read cycle that occurs on a PCI bus.
Figure 5:
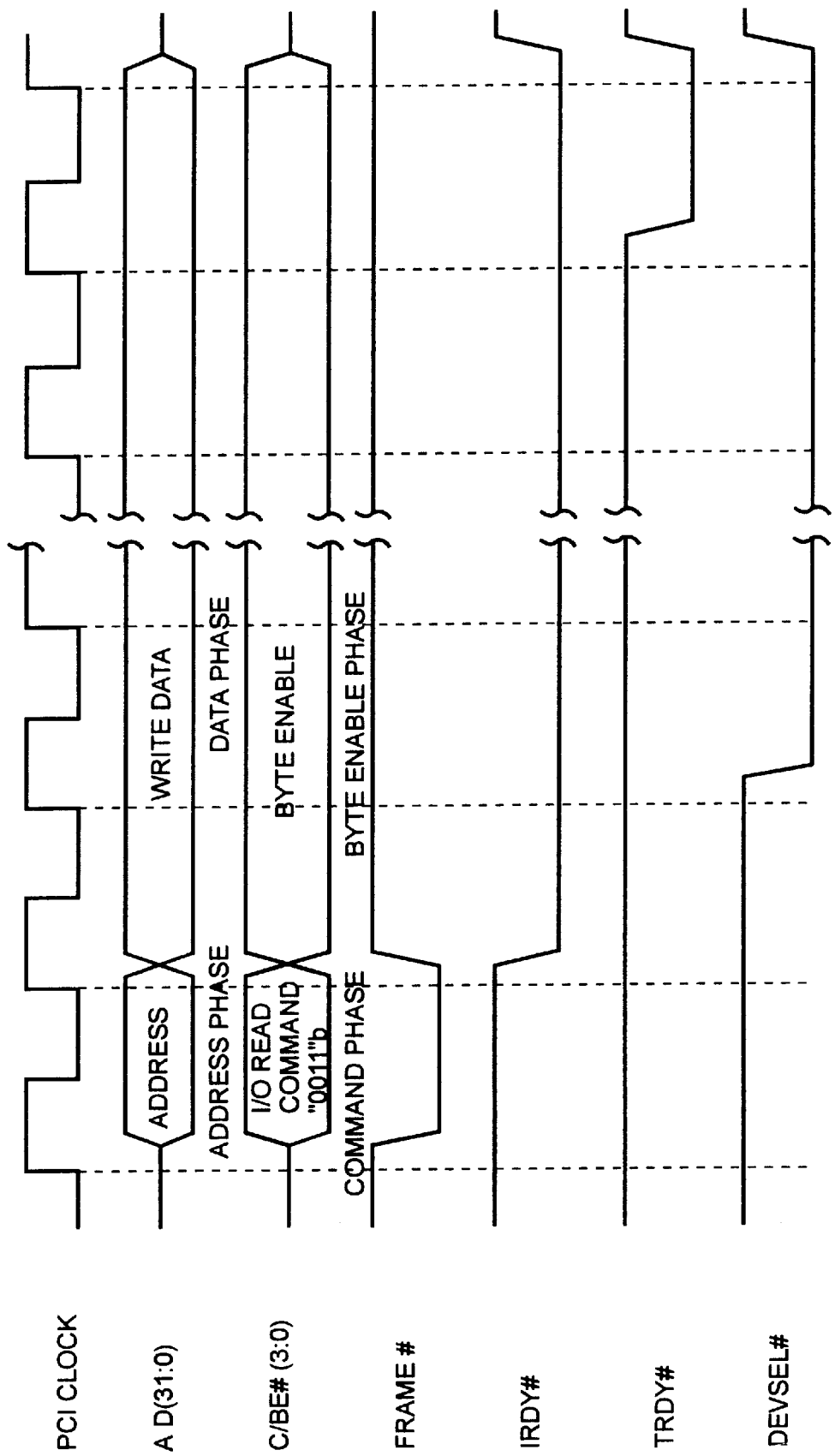
FIG. 5 is a timing chart for a write cycle that occurs on a PCI bus.

Provided that the local bus 16 is a PCI bus, when transactions for reading or writing data are performed between an initiator (i.e., a command transmitter) and a target (i.e., a command receiver), a read cycle or a write cycle are generated on the bus 16. FIGS. 4 and 5 show the timing charts of read cycle and write cycle respectively. The individual bus cycles will be briefly described.

As is shown in FIG. 4, an address/data bus is present in an address phase during a period for a first PCI clock cycle in a read cycle, and an initiator continues to transmit an I/O port address that specifies an access destination. C/BE (Command/Bus Enable) #(3:0) exists in a command phase, and the initiator continues to transmit a value "0010"b that indicate the read cycle. Further, the initiator renders FRAME# active (i.e., pulls it low) to specify the start of a bus cycle.

At the following PCI clock cycle, the initiator returns FRAME# to inactive (i.e., pulls it high). Further, the initiator renders IRDY (Initiator Ready)# active (i.e., pulls it low) when the initiator itself is set to ready.

Then, the address/data bus enters a data undetermined phase. C/BE#(3:0) enters a byte enable phase, and the initiator continues to transmit a byte enable value that indicates a reading byte position in the I/O register. The byte enable value is determined in accordance with the I/O port address, which is an access destination.

When the target recognizes, from the received I/O port address, that the target itself is an access destination, it renders DEVSEL# (Device Select #) active (i.e., pulls it low) to respond.

When the target is set to ready, it renders the TRDY# (Target Ready #) active (i.e., pulls it low). At this time, the address/data bus has entered the data phase, and the target begins to transmit the data via a predetermined I/O port address to the address/data bus.

Then, the IRDY# and the TRDY# are rendered inactive (i.e., pulled high), and the bus cycle is terminated.

During the read cycle, the bridge circuit 14, which issues a command instead of the CPU 11 (more specifically, the BIOS) serves as the "initiator". The I/O controller 23, which physically includes a data register and a control/status register for serial transfer and parallel transfer, serves as the "target".

As is shown in FIG. 5, an address/data bus is present in an address phase during a period for a first PCI clock cycle during a write cycle, and an initiator continues to transmit an I/O port address that specifies an access destination. C/BE# (3:0) exists in a command phase, and the initiator continues to transmit a value "0011"b in order to indicate the write cycle. Further, the initiator renders FRAME# active (i.e., pulls it low) to specify the start of a bus cycle.

At the following PCI clock cycle, the initiator returns FRAME# to inactive (i.e., pulls it high). Further, the initiator renders IRDY# active (i.e., pulls it low) when the initiator itself is set to ready.

Then, the address/data bus enters a data phase, and the initiator continues to transmit data via the designated I/O port address. C/BE#(3:0) enters a byte enable phase, and the initiator continues to transmit a byte enable value that indicates a writing byte position in the I/O register. The byte enable value is determined in accordance with the I/O port address that indicates an access destination.

When the target recognizes, from the received I/O port address, that the target itself is an access destination, it renders DEVSEL# active (i.e., pulls it low) to respond.

When the target is set to ready, it renders the TRDY# active (i.e., pulls it low). The target also receives data that are outputted across the address/data bus, and writes the data at a predetermined I/O port address.

Then, the IRDY# and the TRDY# are rendered inactive (i.e., pulled high), and the bus cycle is terminated.

During the write cycle, the bridge circuit 14, which issues a command instead of the CPU 11 (more specifically, the BIOS) serves as the "initiator". The I/O controller 23, which physically includes a data register and a control/status register for serial transfer and parallel transfer, serves as the "target".

As is shown in FIGS. 4 and 5, provided that the local bus 16 is a PCI bus, a bus cycle is specified for all address/data buses having a 32-bit width, and 0 to 3 bit control buses C/BE#, FRAME#, IRDY#, TRDY#, and DEVSEL#. Therefore, so long as the bus cycle detector 50a snoops these signal lines, it can detect an access cycle for a desired I/O port address (it should be noted that the address bus and the data bus are multiplexed according to the specifications for the PCI bus).

Specific I/O port address examples in this embodiment are 1) a data port for serial transfer, and 2) an I/O port assigned both to a control register and to a status register for serial transfer. In an IBM PC/AT compatible apparatus, address 3F8h (or either address 2F8h, address 3E8h, or address 2E8h) is assigned to the data port for serial transfer. Address 3F9h to address 3FFh (or, address 2F9h to address 2FFh, address 3E9h to address 3EFh, or address 2F9h to address 2EFh) are assigned to the control/status registers. Other examples of I/O ports are 1) a data port for parallel transfer, and 2) I/O ports assigned either to a control register or a status register for parallel transfer. In an IBM PC/AT compatible apparatus, address 3BCh (or either address 378h or address 278h) is assigned to the data port for parallel transfer. Address 3BDh to address 3BFh (or either address 379h to address 37Fh, or address 279h to address 27Fh) are assigned to the control/status registers. While data transfer is to be performed via a communication port, such as the serial port 24 or the parallel port 25 (or while a commutation application is being executed), the access (including reading and writing) to the data port or the control/status registers are generated (previously described). The reason why the bus cycle detector 50a should detect a bus cycle for accessing these specific I/O ports, and the effect obtained will become obvious during the course of the following explanation.

It would be easily understood by one having ordinary skill of the art that the bus cycle detector 50a for detecting an access cycle for a specific I/O port can be implemented as a hardware circuit.

As is previously described, the state determiner 50b determines how far the performance of the CPU 11 can be currently lowered (i.e., the lowest permissible performance of the CPU 11) in accordance with the notice from the bus cycle detector 50a.

An event wherein the state of the CPU 11 should be shifted is as follows.

1) Access to a data port of a communication port

One example of events that affect the activity of the CPU 11 is an access cycle to a data port of a communication port. More specifically, an event (transition event Tr1) that a predetermined time (T1) has elapsed since a last access cycle to the data port, and an event (transition event Tr3) that the access cycle to the data port occurred affect the activity of the CPU 11. The communication port may be the serial port 24 or the parallel port 25. In an IBM PC/AT compatible apparatus, address I/O port 3F8h (or either address 2F8h, address 3E8h, or address 2E8h) is assigned to the data port, and address 3BCh (or either address 378h or address 278h) is assigned as a data port for both of the ports 24 and 25. The access to the data port frequently occurs during data transfer via the communication port.

2) Access to control/status registers of a communication port

Another event that affects the activity of the CPU 11 is an access cycle to the control/status registers of the communication port. More specifically, an event (transition event Tr2) that a predetermined time (T2) has elapsed since a last access cycle to the control/status registers, and an event (transition event Tr4) that the access cycle to the control/ status register has occurred affect the activity of the CPU 11. The communication port may be the serial port 24 or the parallel port 25. In an IBM PC/AT compatible apparatus, address 3F9h to address 3FFh of the I/O port (or address 2F9h to address 2FFh, address 3E9h to address 3EFh, or address 2F9h to address 2EFh) are assigned to the control/ status registers for the serial port 24. And address 3BDh and address 3BFh (or, address 379h and address 37Fh, or address 279h and address 27Fh) are assigned to the control/status registers for the parallel port 25. The access to the control/ status registers occurs before the data transfer is performed via the communication port (i.e., before the communication application is activated), or during the execution of the end process after the data transfer is completed (previously mentioned).

The state determiner 50b detects the above described transition events Tr1 through Tr4 to determine the lowest permissible performance of the CPU 11. The transition events Tr3 and Tr4 can be detected from the notices transmitted by the bus cycle detector 50a, as is described above. The transition events Tr1 and Tr2 can be detected by its watch off timer (not shown) that counts the time elapsed since the notices for the Tr3 and Tr4 were received from the bus cycle detector 50a. In accordance with the empirical rules of the present inventors, T1=1 sec and T2=5 sec seem to be appropriate for the time to be measured.

Figures 6, 9:
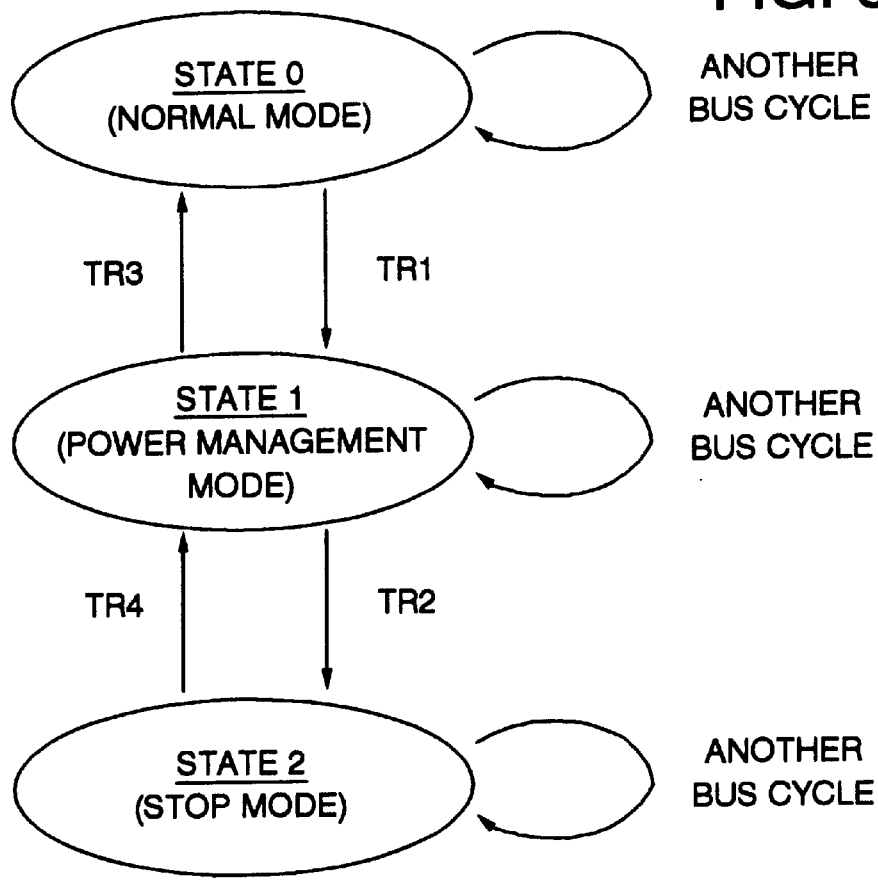
FIG. 6 is a state machine diagram showing the operational characteristics of a state determiner 50b.
FIG. 9 is a table showing the I/O port address.

FIG. 6 is a state machine diagram showing the determination contents obtained by the state determiner 50b. The states and the events for transition between the states will now be described.

State 0:

A state 0 is the state where the CPU 11 is fully active at a high speed clock, and corresponds to a "normal mode" of operation.

When the transition event Tr1 is detected in the state 0, the state machine enters to a state 1.

Further, when another bus cycle is detected by the bus cycle detector 50a in the state 0, the state is merely returned to the same state 0.

State 1:

The state 1 is the state where the performance of the CPU 11 can be lowered to a degree, and corresponds to a "power saving mode" of operation. The power saving mode may be a slow clock mode of the CPU 11. The permissible level to which the performance is lowered is a level at which there is no deterioration of a turn around time and through-put.

When the transition event Tr1 is detected in the state 0, the state machine enters the state 1, as is described above. When the predetermined time T1 (=1 sec) has elapsed since a last access cycle to the data port of the communication port, this means that the system 100 is not in a period of data transfer, and activity relative to the communication ports 24 and 25 is only for the initial setup phase or the end process phase. In this case, since the performance of the CPU 11 can be lowered as much as is required for the initial setup or the end process, the state machine therefore enters the state 1.

When the transition event Tr3 is detected in the state 1, the state machine is recovered to the state 0. When the access cycle to the data port of the communication port has occurred, this means that the system 100 enters the data transfer phase. Since the CPU 11 must be fully active during the data transfer in order to process without delay the data to be transferred, the state machine is returned to state 0 in order to inhibit the lowering of the performance.

When the transition event Tr2 is detected in the state 1, the state machine further enters a state 2.

Even when another bus cycle is detected by the bus cycle detector 50a in the state 1, the state machine is merely returned to the state 1.

State 2:

The state 2 is the state where the operation of the CPU 11 can be completely halted. Such a state for the CPU 11 corresponds to "stop mode" operation. The stop mode may be a stop clock mode wherein the clock controller 60 is activated to halt the input of a clock to the CPU 11.

When the transition event Tr2 is detected in the state 1, the state machine further enters the state 2, as is described above. When the predetermined time T2 (=5 sec) has elapsed since a last access cycle to the control/status register of the communication port, this means that there is no activity relative to the communication ports 24 and 25 because the setup or the canceling of the control value and the reading of the status are not performed. A delay time (about 1 msec) is required to recover to the normal mode once the CPU 11 is completely halted. However the system does not enter the data transfer phase (the state 0) so long as the initial setup phase (state 1) is not passed through. Thus, if the transition event Tr2 is satisfied, the operation of the CPU 11 can be halted.

When the transition event Tr4 is detected in the state 2, the state machine is recovered to the state 1. When the access cycle to the control/status register of the communication port has occurred again, this means that the system 100 has entered the initial setup phase for data transfer. Thus, the state machine is recovered to the state 1 to permit the CPU 11 to operate with a performance that is high enough to perform the initial setup.

Even when another bus cycle is detected by the bus cycle detector 50*a* in the state 2, the state machine is merely returned to the state 2.

The reason why the state determiner 50*b* should determine the state as shown in FIG. 6 in response to the access of these specific I/O ports, and the obtained effects, will become more clear from the following explanation.

It would be easily understood by one having ordinary skill of the art that the state determiner 50*b* that is driven according to the state machine diagram in FIG. 6 can be implemented as a hardware circuit.

The signal generator 50*c* performs throttling of the low/high level of STPCLK# at a predetermined interval to provide an intermittent operating clock for the CPU 11, and thus implements the slow clock mode.

The intermittent operating clock is provided for the CPU 11 to enable it to perform the initial setup for the communication ports 24 and 25, and the end process, while not deteriorating the turn around time and the through-put. For a CPU that is driven at 133 MHz, for example, the operating clock can provide an intermittent operating time that is one fourth or one eighth the normal. This is equivalent to a reduction in the power consumption by the CPU in the slow clock mode to one fourth or one eighth of that in the normal mode.

When the idle state of the CPU 11 is detected, the APM driver calls the APM BIOS, as previously mentioned. The APM BIOS in this embodiment is employed to operate the signal generator 50*c*. That is, if the APM BIOS is called during the period that the state determiner 50*b* is in the state 1, the APM BIOS activates the signal generator 50*c* to shift the CPU 11 to the slow clock mode. From the view of the activities of the communication ports 24 and 25, the lowering of the performance of the CPU 11 does not hinder the operation.

The hardware and software arrangement of the computer system that embodies the present invention have been described above. The processing of the present invention together with the operation of the system 100 will now be described.

FIG. 7(*a*) shows the further detailed condition of the system 100 while a communication application is being executed. A period where the communication application is activated is divided into the initial setup phase, the data transfer phase, and the end process phase.

In the initial setup phase, control values, such as a baud rate, an IRQ level and an FIFO, are written into the control register of the communication port 24 or 25, or the status register is accessed to perform transactions that recognize the status of the communication port 24 or 25. During this phase period, the I/O ports that are assigned to the control/status registers (address 3F9h to address 3FFh, 2F9h to address 2FFh, address 3E9h to address 3EFh, or address 2F9h to address 2EFh for serial transfer, and address 3BDh to address 3BFh, address 379h to address 37Fh, or address 279h to address 27Fh for parallel transfer) are accessed relatively frequently. The initial setup phase includes a wait time until the data transfer is actually begun.

In the data transfer phase, the input and output of data are actually performed. During this phase period, therefore, the data port of the communication port 24 or 25 (one of address 3F8h, address 2F8h, address 3E8h, and address 2E8h for serial transfer, and one of address 3BCh, address 378h, and address 278h for parallel transfer) are accessed relatively frequently.

In the end process phase, transactions are performed for canceling the IRQ level reserved at the initial setup and for recognizing the status register of the communication port 24 or 25. In this phase period, the I/O ports (address 3F9h to address 3FFh, address 2F9h to address 2FFh, address 3E9h to address 3EFh, or address 2F9h to address 2EFh for serial transfer, and address 3BDh to address 3BFh, address 379h to address 37Fh, or address 279h to address 27Fh for parallel transfer) are accessed relatively frequently.

In accordance with the empirical rules of the present inventors, the following facts are established:
(1) When an access to the data port of the communication port 24 or 25 has not occurred for the predetermined time T1 (=1 sec), this means that the system 100 is not in the data transfer phase.
(2) When an access to the control/status registers of the communication port 24 or 25 has not occurred for the predetermined time T2 (=5 sec), this means that either the system 100 has completed the end process or the system 100 has not yet entered the initial setup phase.
(3) The data transfer phase is not entered unless the initial setup phase is passed through.

In FIG. 7(*b*) is shown the results of the determination (the condition) of the state determiner 50*b* for each phase.

When there is no access to any I/O port of the communication port 24 or 25, the CPU 11 is permitted to be completely halted from the view point of the activity of the communication port 24 or 25. The state determiner 50*b* is therefore in the state 2 so that it can specify the effect whereby the stop clock mode for the CPU 11 is permitted.

When the condition enters the initial setup phase, the access cycle (i.e., the transition event Tr4) to the communication port 24 or 25 to the control/status registers occurs. During this period, the CPU 11 must be active, and its performance must at least be higher than that in the slow clock mode in order for the control values to be set, and the status register to be recognized without any problem. Thus, the state determiner 50*b* enters the state 1 to specify the effect whereby the slow clock mode of the CPU 11 is permitted but the stop clock mode is inhibited. The initial setup phase is also a period wherein the system is expected to enter the data transfer phase.

When the system enters the data transfer phase, the access cycle (i.e., the shifting requirement Tr3) to the data port of the communication port 24 or 25 occurs. During this period, the CPU 11 must be fully active in the normal mode, so that data that are to be transferred at a relatively high speed can be processed without any delay (i.e., without losing any data). Thus, the state determiner 50*b* enters the state 0 to specify the effect whereby the lowering the performance of the CPU 11 is inhibited. From the state 1, i.e., from the slow clock mode, the CPU 11 can recover to the normal mode without almost any delay.

Following this, the system enters the end process phase. When the predetermined time T1 has elapsed since a last access cycle to the data port of for the communication port 24 or 25, the transition event Tr1 occurs. During this period, only the IRQ level is canceled and the status register is confirmed. The CPU 11 does not have to be fully active and can be in the slow clock mode. The state determiner 50*b* enters the state 1 again to indicate that the slow clock mode of the CPU 11 is permitted.

When the system passes through the end process phase, and then the predetermined time T2 has elapsed since a last access cycle to the control/status registers of the communication port 24 or 25, the transition event Tr2 occurs. During this period, the CPU 11 is permitted to be halted completely from the view point of the activity of the communication port 24 or 25. The state determiner 50b enters the state 2 again to indicate the effect whereby the stop clock mode of the CPU 11 is permitted.

In FIG. 7(c), for convenience sake, is shown an example of the activity of the CPU 11.

The activity of the CPU 11 is performed by the APM driver detecting whether or not an effective task is present in the queue of a scheduler, as is previously described. The graph in FIG. 7(c) shows that CPU idle I1, I2, I3, I4 and I5 for the CPU 11 are detected before the communication application is activated, during the initial setup phase, during the data transfer phase, during the end process phase, and after the communication application is completed. In FIG. 7(d) is shown the power management operation of the CPU 11 that is carried out when the activity of the CPU 11 is detected.

When the CPU idle 11 is detected, the state determiner 50b is in the state 2 and the complete stopping of the CPU 11 is permitted. The APM driver, in response to the detection of the 11, can call the APM BIOS. The APM BIOS activates the clock controller 60 to set the CPU 11 in the stop clock mode.

When the CPU idle 12 is detected, the state determiner 50b is in the state 1. The complete stopping of the CPU 11 is inhibited but lowering the performance of the CPU 11 is permitted. The APM driver, in response to the detection of the 12, can call the APM BIOS. The APM BIOS deactivates the clock controller 60 and the activates the signal generator 50b to set the CPU 11 in the slow clock mode. It should be noted that, according to the present invention, the CPU 11 can be set in the slow clock mode even though at this time the system 100 is executing a communication application.

When the CPU idle 13 is detected, the state determiner 50b is in the 2 and even lowering the performance of the CPU 11 is inhibited. The APM driver, in response to the detection of the 13, can not call the APM BIOS, and the CPU 11 remains in the normal mode.

When the CPU idle 14 is detected, the state determiner 50b is in the state 1. The complete stopping of the CPU 11 is inhibited but lowering the performance of the CPU 11 is permitted. The APM driver, in response to the detection of the 14, can call the APM BIOS. The APM BIOS activates the signal generator 50b to set the CPU 11 in the slow clock mode. It should be noted that, according to the present invention, the CPU 11 can be set in the slow clock mode even though at this time the system 100 is executing a communication application.

When the CPU idle 15 is detected, the state determiner 50b is in the state 2 and the complete stopping of the CPU 11 is permitted. The APM driver, in response to the detection of the 15, can call the APM BIOS. The APM BIOS activates the clock controller 60 to set the CPU 11 in the stop clock mode.

The present invention has been described in detail while referring to a specific embodiment. However, it should be obvious to one having ordinary skill in the art that various modifications or revisions of the embodiment are possible within the scope of the present invention. The present invention can be employed for various electric/electronic devices, for example: facsimile apparatuses; various cordless devices, such as portable ratio terminals, cordless telephones, electronic notebooks and portable video cameras; and word processors. Although, in this embodiment, the power management of the CPU at the time of serial transfer and parallel transfer has been described, the present invention can be applied to a different type of communication with another apparatus (e.g., radio communication, such as infrared ray (IR) communication).

That is, although the present invention has been disclosed by using an example, it should not be limited to that example. To fully understand the subject of the present invention, the claims should be referred to.

The I/O port addresses and the allocation of the IRQ levels, which are described in this specification, conform to the standards of compatible machines of the IBM PC/At series.

As is described above, according to the present invention, provided is an excellent information processing apparatus that has a power saving function according to which power consumption can be lowered, by reducing the operating frequency of a processor (a CPU) that serves as a nucleus for data processing or by halting the operation of the processor.

According to the present invention, provided is an excellent information processing apparatus that can reduce the operating frequency of a CPU, or halt the operation of the CPU, while the system satisfactorily responds to power management and system security requests.

In addition, according to the present invention, provided is an excellent information processing system that can reduce the operating frequency of a CPU, or halt the operation of the CPU, in accordance with an appropriate timing, by exactly ascertaining the operational state of the CPU.

Further, according to the present invention, provided is an excellent information processing system that can reduce the operating frequency of a CPU, or halt the operation of the CPU, at an adequate timing, even when the system is engaged in exchanging data with another independent apparatus (e.g., another PC) via a communication port (a serial port or a parallel port), or when a communication application is being executed.

What is claimed is:

1. A power management system for selectively implementing an operating mode of a CPU in conformity with the level of communication between the CPU and an independent apparatus, said system comprising:

(1) a CPU that operates in at least a normal mode, a power-saving mode in which it consumes less power than the normal mode and a stop mode in which CPU operation is essentially halted;

(2) at least one peripheral device;

(3) a bus connecting between said CPU and said peripheral device;

(4) at least one communication port operatively connected to said bus to support a connection to an independent apparatus;

(5) a storage including port-associated locations to receive predefined data and control/status information for respective of said communication ports;

(6) a bus cycle detector operatively connected to detect access to said port associated locations; and (7) a state determiner responsive to said bus cycle detector and coupled to said CPU to establish a mode for said CPU based upon access occurring to said port-associated locations whereby the CPU may be operated at the normal mode, the power-saving mode, or the sleep mode in consideration of communication port activity.

2. A power management system according to claim 1 wherein said state determiner triggers a transition from stop mode to power saving mode in response to an access to a control/status location for a port.

3. A power management system according to claim 2 wherein said state determiner triggers a transition from power saving mode to normal mode in response to an access to a data location for a port.

4. A power management system according to claim 3 wherein said state determiner triggers a transition from normal mode to power saving mode after a predefined first time interval following an access to a data location for a port.

5. A power management system according to claim 4 wherein said state determiner triggers a transition from power saving mode to stop mode response to predefined second time interval after access to a control/status location for a port.

* * * * *